(12) United States Patent
Hegde et al.

(10) Patent No.: US 10,558,389 B2
(45) Date of Patent: Feb. 11, 2020

(54) PER-STORAGE CLASS QUALITY OF SERVICE (QOS) MANAGEMENT WITHIN A DISTRIBUTED STORAGE NETWORK (DSN) WHERE THE DSN STORES DATA USING DISPERSED STORAGE ERROR DECODING/ENCODING

(71) Applicant: International Business Machines Corporation, Armonk, NY (US)

(72) Inventors: Harsha Hegde, Hawthorn Woods, IL (US); Wesley B. Leggette, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/270,758

(22) Filed: Sep. 20, 2016

(65) Prior Publication Data
US 2018/0081592 A1    Mar. 22, 2018

(51) Int. Cl.
*G06F 3/06*     (2006.01)
*G06F 11/10*   (2006.01)

(52) U.S. Cl.
CPC ............ *G06F 3/0659* (2013.01); *G06F 3/067* (2013.01); *G06F 3/0611* (2013.01); *G06F 11/1076* (2013.01); *G06F 3/064* (2013.01)

(58) Field of Classification Search
CPC ...... G06F 3/0659; G06F 3/0611; G06F 3/067; G06F 3/064; G06F 11/1076
See application file for complete search history.

(56) References Cited

U.S. PATENT DOCUMENTS

| | | | |
|---|---|---|---|
| 4,092,732 A | 5/1978 | Ouchi | |
| 5,454,101 A | 9/1995 | Mackay et al. | |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Glenn Gossage
(74) *Attorney, Agent, or Firm* — Garlick & Markison; Timothy W. Markison; Patricia A. Markison

(57) ABSTRACT

A dispersed storage (DS) processing unit and method for quality of service (QoS) management in a dispersed or distributed storage network (DSN) are disclosed. The method includes receiving a request to access a set of encoded data slices from a first user computing device of a plurality of user computing devices of the DSN, where the set of encoded data slices is stored in a set of storage units of the DSN, and where a first storage container of a plurality of storage containers of the DSN includes the set of storage units and supports a first group of logical storage vaults of a plurality of logical storage vaults of the DSN, and the first user computing device is affiliated with a first logical storage vault of the first group of logical storage vaults. The method further includes determining a quality of service (QoS) matrix regarding the request when QoS issues exists. The QoS matrix includes classes for the plurality of user computing devices, the plurality of logical storage vaults, and the plurality of storage containers, and a plurality of performance properties for each class. The method further includes determining QoS levels attributable to the first user computing device, the first logical storage vault, and the first storage container. The method further includes determining processing priority of the request based on the QoS matrix and QoS levels, and executing the request in accordance with the processing priority. The performance properties (Continued)

| request 1 QoS matrix | | |
|---|---|---|
| container 1 | logical storage vault 1 | user computing device 1 |
| requests per time frame? | requests per time frame? | requests per time frame? |
| data transfer rate? | data transfer rate? | data transfer rate? |
| storage quota? | storage quota? | storage quota? |
| latency? | latency? | latency? | may include a number of requests per frame, data transfer rate, storage quota and latency guarantee, and a dispersed storage (DS) processing unit of the DSN may determine whether the QoS issue is a container level issue, a vault level issue or a user computing device level issue.

16 Claims, 11 Drawing Sheets

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,832,248 B1 * | 12/2004 | Byrnes .................. H04L 29/06 707/999.001 |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters, III et al. |
| 2009/0034428 A1 * | 2/2009 | Jeong .................. H04L 47/10 370/252 |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2011/0314355 A1 * | 12/2011 | Grube ................. G06F 11/1076 714/763 |
| 2012/0290877 A1 * | 11/2012 | Grube ................. G06F 11/0727 714/15 |
| 2013/0014254 A1 * | 1/2013 | Gladwin ............. G06F 11/1084 726/22 |
| 2013/0212340 A1 * | 8/2013 | Berg ..................... G06F 3/0619 711/154 |
| 2013/0325823 A1 * | 12/2013 | Resch ................. G06F 17/3023 707/695 |
| 2014/0122489 A1 * | 5/2014 | Mesnier .............. H04L 67/1097 707/737 |
| 2016/0065492 A1 * | 3/2016 | Hu ........................ H04L 47/783 709/226 |
| 2018/0004452 A1 * | 1/2018 | Ganguli ............... G06F 3/0604 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

(56) References Cited

OTHER PUBLICATIONS

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

\* cited by examiner distributed, or dispersed, storage network (DSN) 10

FIG. 9A

| request 1 QoS matrix | | |
|---|---|---|
| container 1 | logical storage vault 1 | user computing device 1 |
| requests per time frame? | requests per time frame? | requests per time frame? |
| data transfer rate? | data transfer rate? | data transfer rate? |
| storage quota? | storage quota? | storage quota? |
| latency? | latency? | latency? |

FIG. 11

| request 1 QoS levels | | |
|---|---|---|
| container 1 min requests per time frame | vault 1 min requests per time frame | user 1 min requests per time frame |
| container 1 min data transfer rate | vault 1 min data transfer rate | user 1 min data transfer rate |
| container 1 storage quota | vault 1 storage quota | user 1 storage quota |
| container 1 latency guarantee | vault 1 latency guarantee | user 1 latency guarantee |

FIG. 12

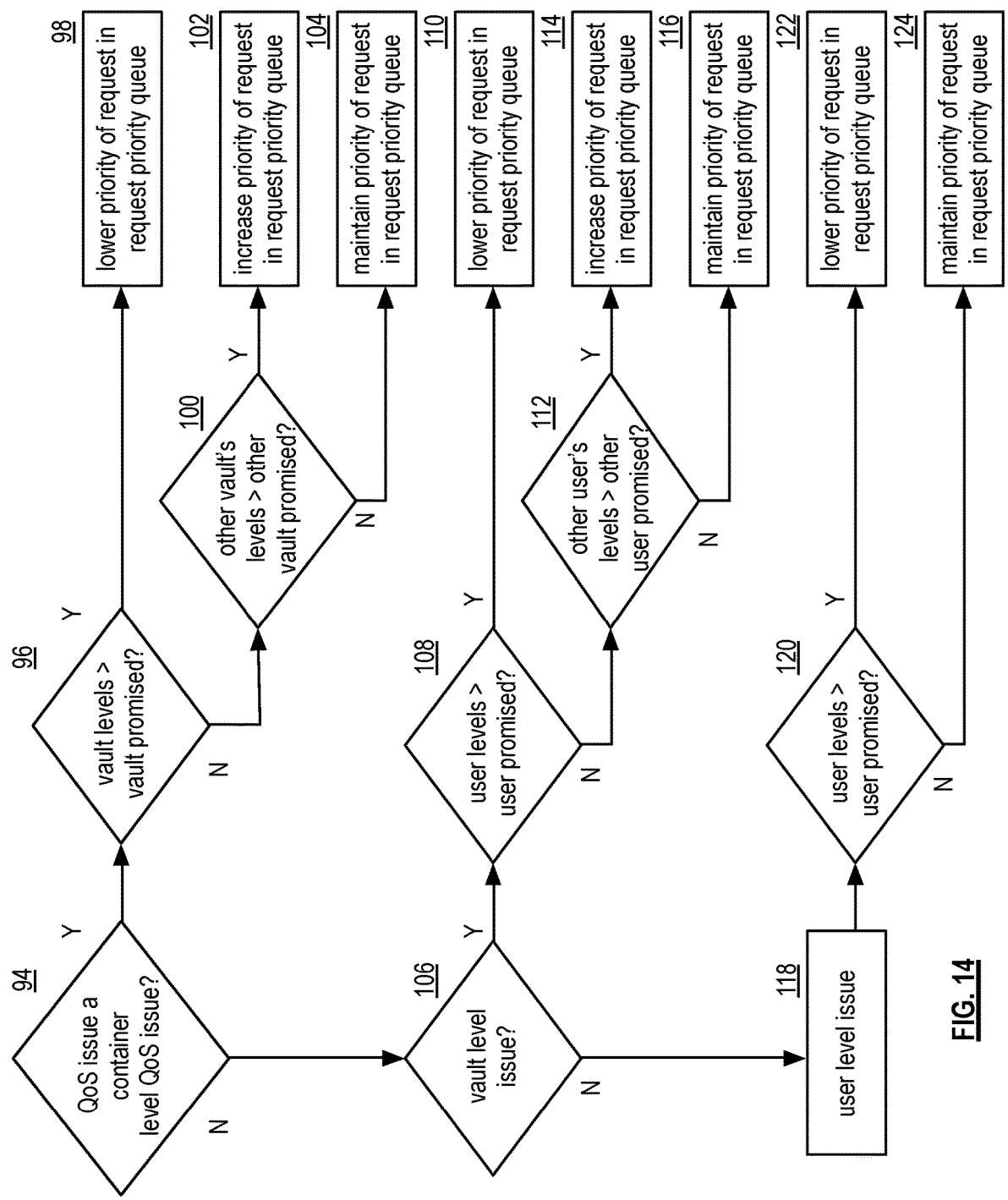

PER-STORAGE CLASS QUALITY OF SERVICE (QOS) MANAGEMENT WITHIN A DISTRIBUTED STORAGE NETWORK (DSN) WHERE THE DSN STORES DATA USING DISPERSED STORAGE ERROR DECODING/ENCODING

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PCs), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 9A is a schematic block diagram of an example of vaults spanning multiple sets of storage units in accordance with the present invention;

FIG. 11 is a schematic block of an example of a quality of service (QoS) matrix regarding a request in accordance with the present invention;

FIG. 12 is a schematic block of an example of QoS levels attributable to storage classes involved in a request in accordance with the present invention;

FIG. 14 is a logic diagram of an example of a method of determining the processing priority of requests in accordance with the present invention.

DETAILED DESCRIPTION OF THE INVENTION

Figure 1:
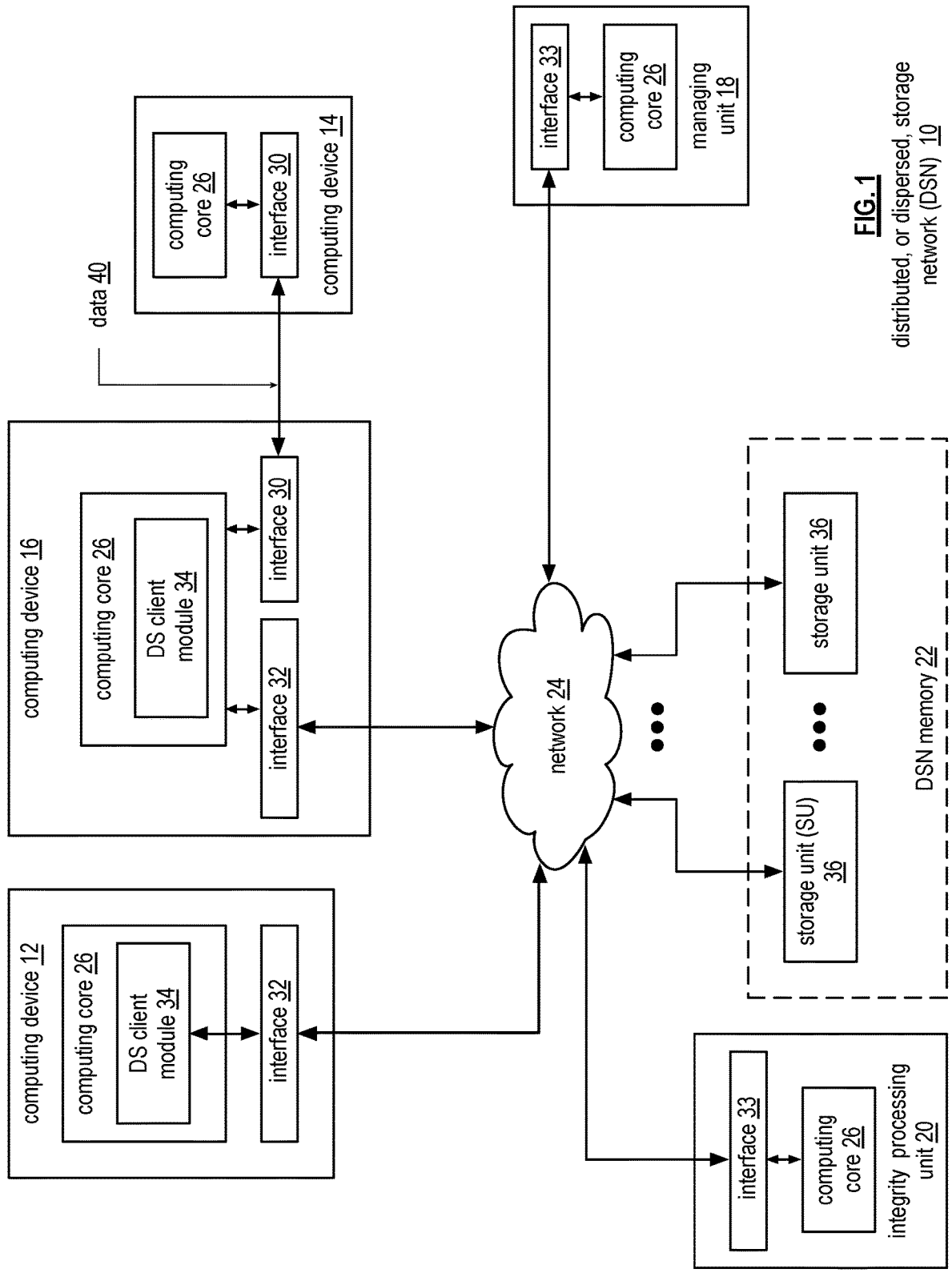
FIG. 1 is a schematic block diagram of an embodiment of a dispersed, or distributed, storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
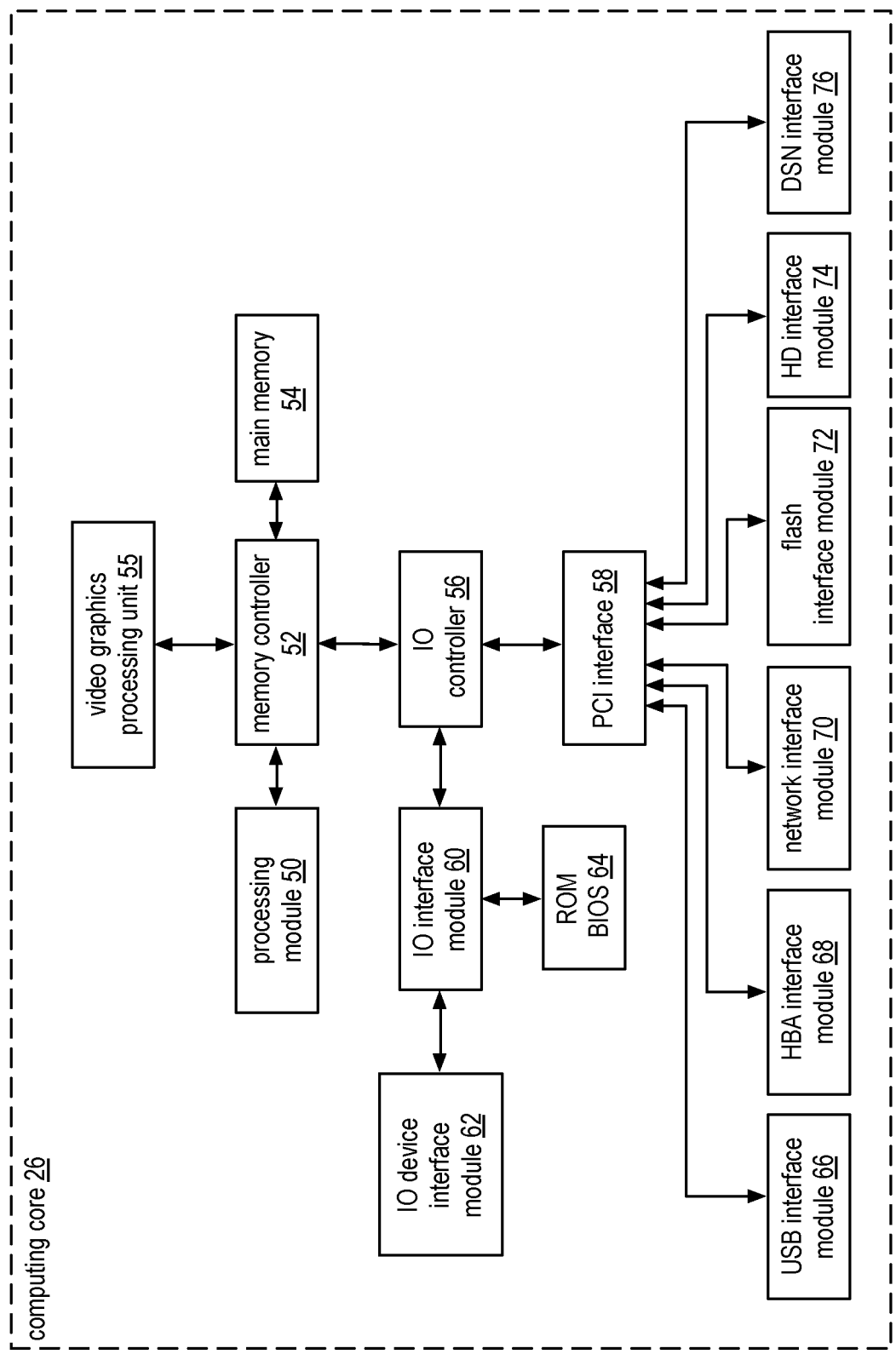
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 includes a computing core 26, and respective network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a local area network (LAN), via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34 which enables the computing devices to perform dispersed storage error encoding and dispersed storage error decoding of data (e.g., data 40), Dispersed storage error encoding and dispersed storage error decoding of data are subsequently described with reference to one or more of FIGS. 3-8. In this example embodiment, computing device 16 functions as a dispersed storage processing agent for computing device 14. In this role, computing device 16 dispersed storage error encodes and dispersed storage error decodes data on behalf of computing device 14. With the use of dispersed storage error encoding and dispersed storage error decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive (HD) interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figure 3:
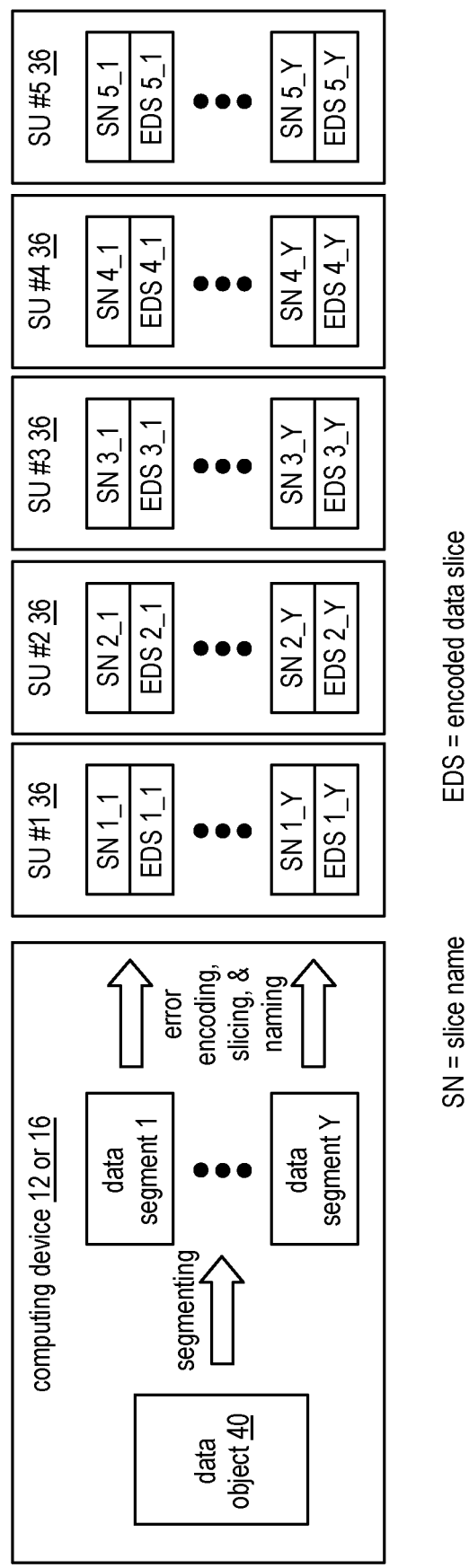
FIG. 3 is a schematic block diagram of an example of dispersed storage error encoding of data in accordance with the present invention.

FIG. 3 is a schematic block diagram of an example of dispersed storage error encoding of data. When a computing device 12 or 16 has data to store, it dispersed storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then dispersed storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
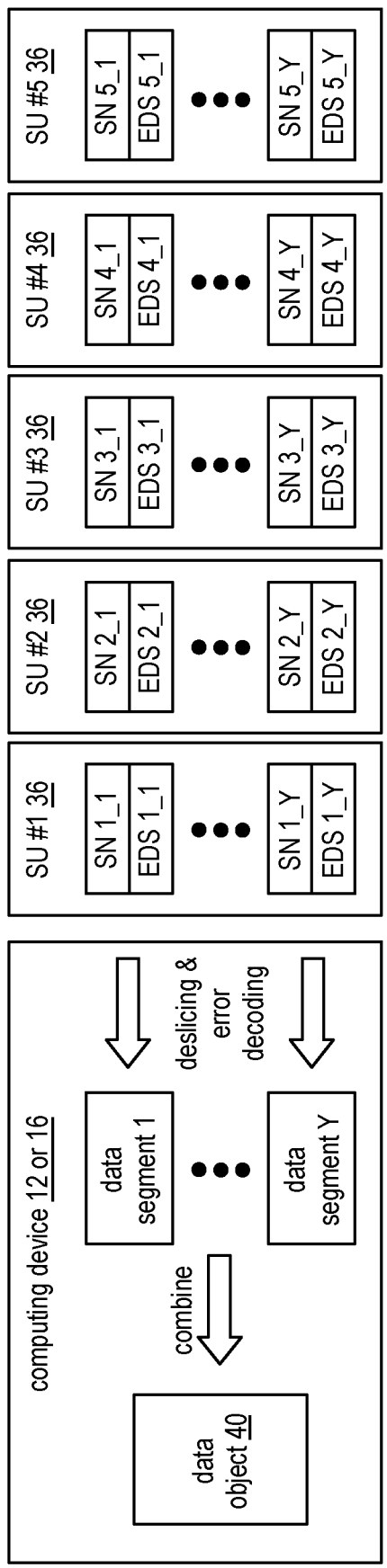
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix is an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
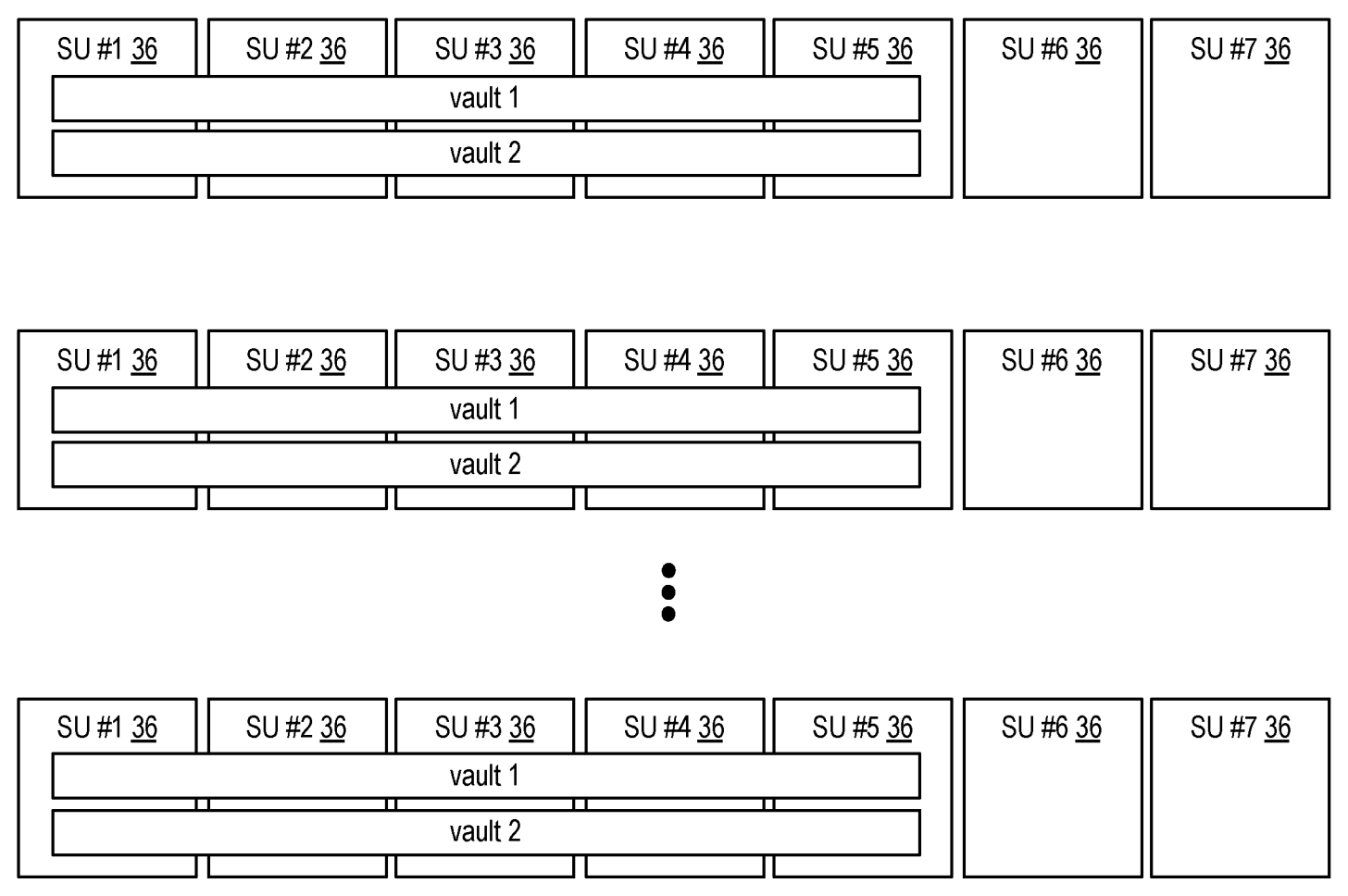

FIG. 9A is a schematic block diagram of an example of vaults spanning multiple sets of storage units. In this example, the DSN memory 22 includes a plurality of storage units 36 arranged into a plurality of sets of storage units. Further, each set includes seven storage units for ease of illustration. A set, however, can have many more storage units than seven and, from set to set, may have different numbers of storage units.

The sets support two logical storage vaults (vault 1 and vault 2) using only five of the seven of storage units. The number of storage units within a set supporting a vault corresponds to the pillar width number, which is five in this example. Note that a set may have rows of storage units, where SU #1 represents a plurality of storage units, each corresponding to a first pillar number; SU #2 represents a second plurality of storage units, each corresponding to a second pillar number; and so on. Further note that other vaults may use more or less than a pillar width number of five storage units.

Figure 9B:
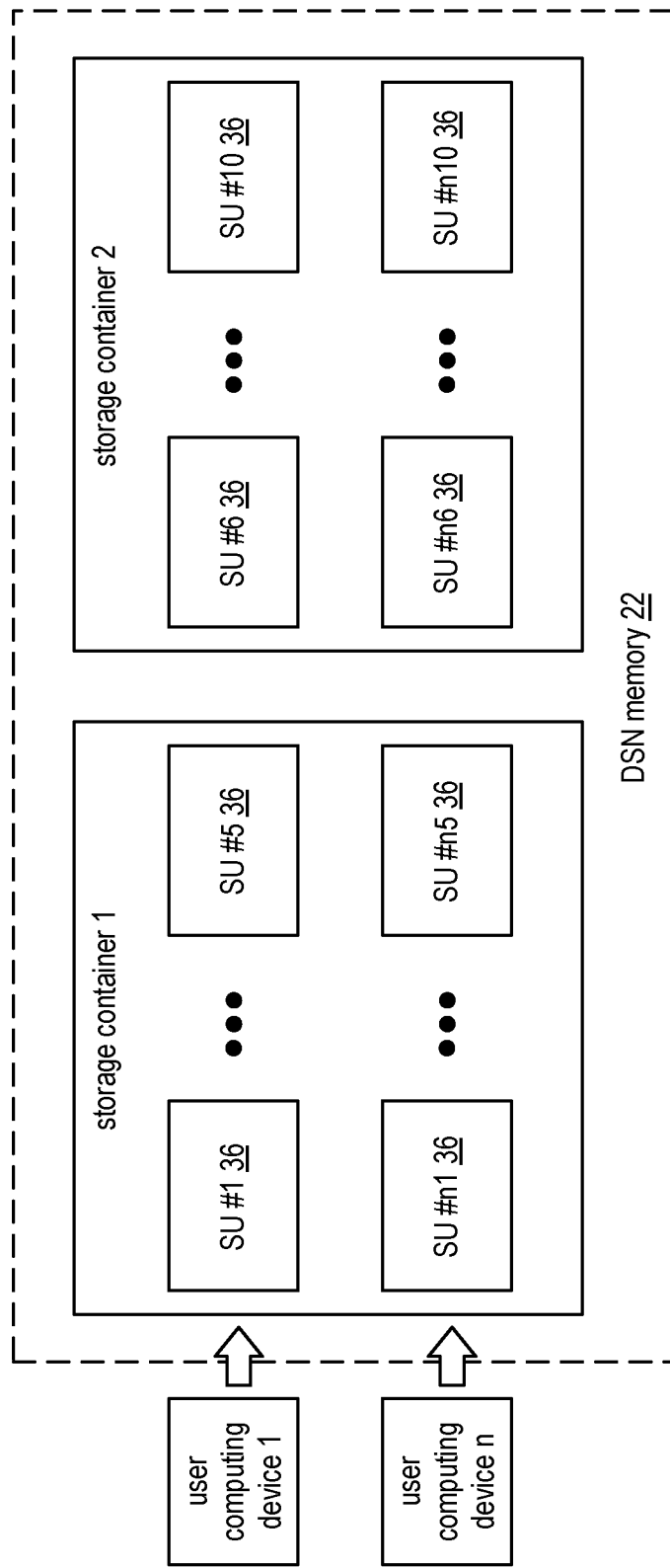
FIG. 9B is a schematic block diagram of an embodiment of one or more storage containers of a DSN memory in accordance with the present invention.

FIG. 9B is a schematic block diagram of an embodiment of one or more storage containers of a DSN memory. A storage container of the DSN memory 22 contains one or more sets of storage units 36. As shown, storage container 1 contains a first set of storage units 1-5 and a second set of storage units n1-n5. Storage container 2 contains a first set of storage units 6-10 and a second set of storage units n6-n10. As discussed above, the sets of storage units of the DSN support a plurality of logical storage vaults. A logical storage vault is a virtual memory space that maps to a set of storage units 36. For example, storage units 1-5 of storage container 1 may support a logical storage vault 1 where logical storage vault 1 is affiliated with user computing device 1 such that storage units 1-5 represent user computing device 1's DSN memory space. Further a logical storage vault n may be affiliated with user computing device n such that storage units n1-n5 represent user computing device n's DSN memory space.

Figure 10:
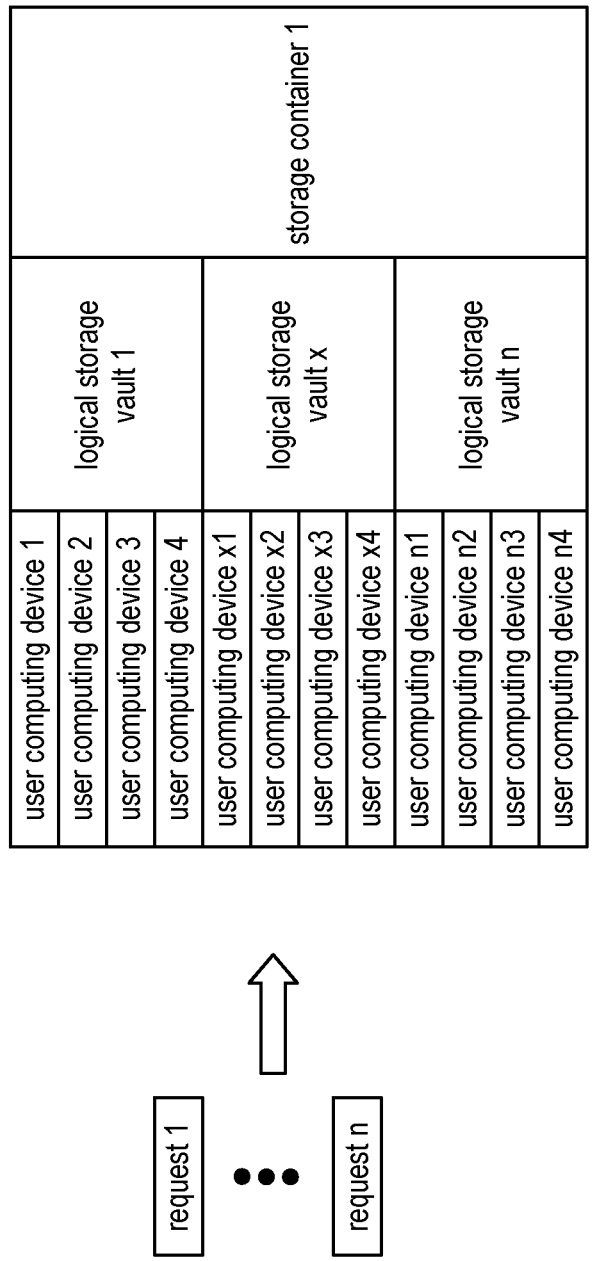
FIG. 10 is a schematic block diagram of storage classes within a DSN in accordance with the present invention.

FIG. 10 is a schematic block diagram of storage classes within a DSN. In this example, there are a plurality of requests 1-n that involve the storage classes. The storage classes include user computing devices, logical storage vaults, and storage containers. The specific storage class entities include user computing devices 1-4, user computing devices x1-x4, user computing devices n1-n4, logical storage vault 1, logical storage vault x, logical storage vault n, and storage container 1. As shown, storage container 1 supports logical storage vaults 1, x, and n. User computing devices 1-4 are affiliated with logical storage vault 1, user computing devices x1-x4 are affiliated with logical storage vault x, and user computing devices n1-n4 are affiliated with logical storage vault n. As an example, user computing device 1 may send a request (e.g., request 1) to a DS processing unit within the DSN in order to access a set of dispersed encoded data slices that are stored in set of storage units within storage container 1. User computing device 1 is affiliated with logical vault 1 and container 1 supports vault 1. As such, all three storage classes (e.g., user computing devices, logical storage vaults, and storage containers) are involved in the processing of request 1 and the specific storage classes involved in the processing of request 1 are computing device 1, logical vault 1, and container 1.

At some point, a DSN memory may fail to process requests (e.g., requests 1-n) with an acceptable quality of service (QoS). For example, the DSN may have insufficient DSN resources such as insufficient storage units or insufficient DS processing units. When there are insufficient resources, requests may take too long to process, fail, be rejected with too great of frequency, not meet expected throughput level, and/or otherwise be unsatisfactory by some QoS measure. To ensure acceptable QoS levels are met, the DS processing unit determines a QoS matrix of performance properties for each entity involved in processing the request. Based on the QoS matrix and the levels attributable to the storage entities involved (i.e., the promised QoS guarantee at each level), the DS processing unit determines a processing priority of the request. The request is then processed in accordance with that processing priority. A more detailed discussion of determining the processing priority of the request is subsequently described with reference to one or more of FIGS. 11-14.

FIG. 11 is a schematic block of an example of a quality of service (QoS) matrix regarding a request. When a quality of service (QoS) issue exists within the DSN (e.g., there are insufficient storage units or DS processing units) a DS processing unit receiving a request to access a set of encoded data slices stored in a set of storage units of the DSN determines a QoS matrix regarding the storage classes (i.e., entities) involved in processing the request. The QoS matrix includes the classes of user computing devices, logical storage vaults, and storage containers and, for each class, includes a plurality of performance properties. The plurality of performance properties includes two or more of number of requests per time frame, data transfer rate, storage quota, and latency guarantee.

In this example, the DS processing unit has received request 1, where request 1 is a request from user computing device 1 to access a set of dispersed encoded data slices that are stored in a set of storage units within storage container 1. User computing device 1 is affiliated with logical storage vault 1 and container 1 supports logical storage vault 1. As such, the specific storage classes involved in the processing of request 1 are computing device 1, logical storage vault 1, and storage container 1. The QoS matrix lists the plurality of performance properties for each of these storage classes. For example, the DS processing unit determines the number of requests per time frame across the user computing device 1, logical storage vault 1, and storage container 1 in the first row of the matrix. In the second row, the DS processing unit determines the current data transfer rate across the user computing device 1, logical storage vault 1, and storage container 1. In the third row, the DS processing unit determines the storage quota across the user computing device 1, logical storage vault 1, and storage container 1. In the last row, the DS processing unit determines the latency across the user computing device 1, logical storage vault 1, and storage container 1.

FIG. 12 is a schematic block of an example of QoS levels attributable to storage classes involved in a request. Each storage class (e.g., user computing device, logical storage vault, and storage container) has a promised QoS guarantee or QoS level. For example, storage container 1, logical storage vault 1, and user computing device 1 (i.e., the storage classes involved in processing request 1) each have a minimum or guaranteed level for each of the plurality of performance properties. The plurality of performance properties includes two or more of number of requests per time frame, data transfer rate, storage quota, and latency guarantee.

Figure 13:
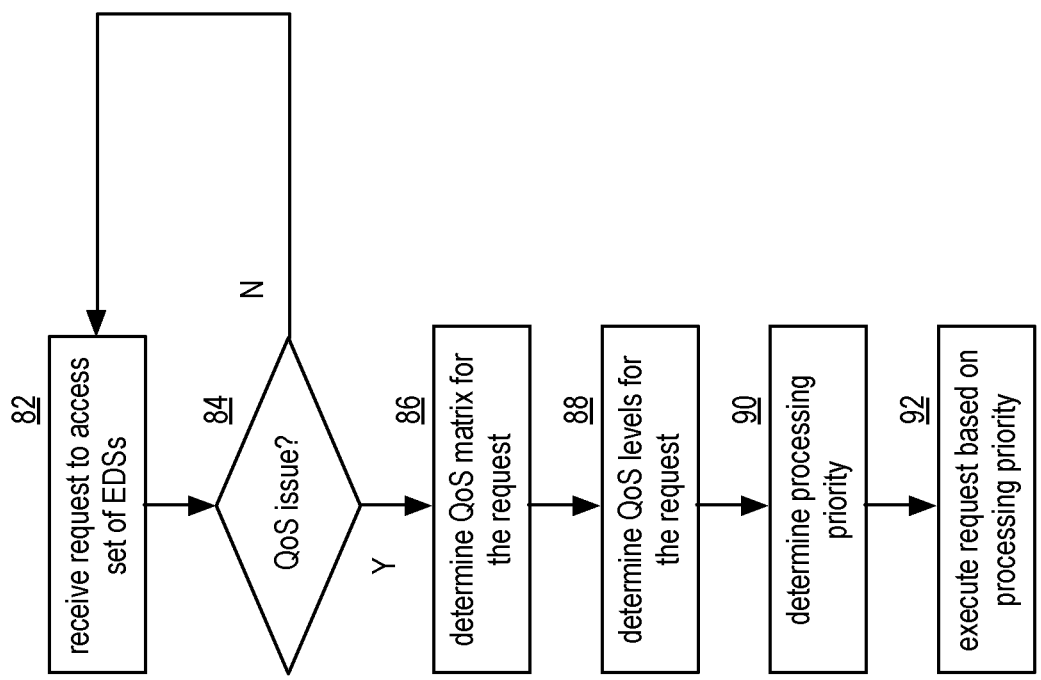
FIG. 13 is a logic diagram of an example of a method of executing a request based on processing priority in accordance with the present invention.

FIG. 13 is a logic diagram of an example of a method of executing a request based on processing priority. The method begins with step 82 where the DS processing unit of the DSN receives a request from a user computing device to access a set of encoded data slices. For example, a user computing device may send a request to a DS processing unit within the DSN in order to access a set of dispersed encoded data slices where a data segment of a data object is dispersed storage error encoded into the set of encoded data slices. The set of encoded data slices is stored in a set of storage units of the DSN, where a storage container of the DSN includes the set of storage units. The storage container supports a plurality of logical storage vaults, and the user computing device is affiliated with a logical storage vault of the plurality of logical storage vaults that are stored in the set of storage units within the storage container.

The method continues with step 84 where the DS processing unit determines whether a quality of service (QoS) issue exists in the DSN. For example, a DSN memory may fail to process requests with an acceptable quality of service (QoS) when the DSN has insufficient storage units or insufficient DS processing units. When there are insufficient storage units or insufficient DS processing units, requests may take too long to process, fail, be rejected with too great of frequency, not meet expected throughput level, and/or otherwise be unsatisfactory by some QoS measure. If no QoS issue exists in the DSN, the method branches back to step 82 where another request is received by the DS processing unit.

When the DS processing unit determines that a QoS issue exists, the method continues to step 86 where the DS processing unit determines a QoS matrix regarding the request. The QoS matrix includes the classes for user computing devices, logical storage vaults, and storage containers and, for each class, includes a plurality of performance properties. The plurality of performance properties includes two or more of number of requests per time frame, data transfer rate, storage quota, and latency guarantee.

The method continues with step 88 where the DS processing unit determines QoS levels attributable to the storage classes involved (e.g., the specific user computing device, logical storage vault, and storage container involved in the request). Each storage container, logical storage vault, and user computing device has a minimum or guaranteed level for each of the plurality of performance properties. As mentioned, the plurality of performance properties includes two or more of number of requests per time frame, data transfer rate, storage quota, and latency guarantee.

The method continues with step 90 where the DS processing unit determines processing priority of the request based on the QoS matrix and the QoS levels. For example, a storage class (e.g., the logical storage vault, user computing device, or storage container) may have a guaranteed performance property level in order for it to function properly. After the DS processing unit has completed the QoS matrix for the storage classes involved in the request, the DS processing unit will determine what the current performance property levels are across the storage classes involved in the request. After comparing the QoS matrix values to the guaranteed levels, the DS processing unit can determine whether the guaranteed level has been exceeded.

The method continues with step 92 where the DS processing unit executes the request in accordance with the processing priority. As an example, if, after comparing the QoS matrix values to the guaranteed levels, the DS processing unit determines that a guaranteed level has been exceeded, the DS processing unit may lower the priority of the request in order to reduce the load of the storage class with the QoS issue.

FIG. 14 is a logic diagram of an example of a method of determining the processing priority of requests. The method begins with step 94 where the DS processing unit determines whether the QoS issue is a container level issue. For example, when the container is overloaded, the DS processing unit will determine that the QoS issue is at the container level.

When the DS processing unit determines that the QoS issue is a container level issue, the method continues to step 96 where the DS processing unit determines whether the request involves a logical storage vault exceeding a QoS level attributable to that logical storage vault. For example, the logical storage vault may have a guaranteed minimum number of requests per time frame in order for it to function properly. After the DS processing unit has completed the QoS matrix for the storage classes involved in the request, the DS processing unit will determine the current number of requests per time frame occurring across the logical storage vault involved in the request. After comparing the QoS matrix value to the guaranteed level, the DS processing unit can determine whether the guaranteed level has been exceeded.

When the DS processing unit determines that the request involves a logical storage vault exceeding a QoS level attributable to that logical storage vault, the method continues to step 98 where the DS processing unit lowers the priority of the request in the request priority queue. Lowering the priority of the request will allow the logical storage vault involved in the request the time needed to return to desired performance levels. By addressing the performance issue with the logical storage vault, the overall container issue will be resolved.

When the DS processing unit determines that the request does not involve a logical storage vault exceeding the QoS level attributable to that logical storage vault, the method continues to step 100 where the DS processing unit determines whether another logical storage vault of the storage container exceeds the QoS level attributable to the other logical storage vault.

When the DS processing unit determines that the other logical storage vault of the storage container exceeds the QoS level attributable to the other logical storage vault, the method continues to step 102 where the DS processing unit increases the priority of the request in the request priority queue. Expediting the processing of the request while another logical storage vault supported by the storage container is failing to meet guaranteed levels will enable the storage container to maintain acceptable performance levels overall.

When the DS processing unit determines that the other logical storage vault of the storage container does not exceed the QoS level attributable to the other logical storage vault, the method continues to step 104 where the DS processing unit maintains the priority of the request in the request priority queue. While the logical storage vaults of the storage container are able to meet guaranteed levels, there is no need to adjust the priority of the request in the request priority queue.

When the DS processing unit determines at step 94 that the QoS issue is not a container level issue, the method continues to step 106 where the DS processing unit determines whether the QoS issue is a vault level issue. For example, when a logical storage vault is overloaded, the DS processing unit will determine that the QoS issue is at the vault level.

When the DS processing unit determines that the QoS issue is a vault level issue, the method continues to step 108 where the DS processing unit determines whether the request involves a user computing device exceeding the QoS level attributable to that user computing device. For example, the user computing device may have a specified data transfer rate that needs to be maintained in order for it to function properly. After the DS processing unit has completed the QoS matrix for the storage classes involved in the request, the DS processing unit will determine what the current data transfer rate is for the user computing device involved in the request. After comparing the QoS matrix value to the guaranteed level, the DS processing unit can determine whether the guaranteed level has been exceeded.

When the DS processing unit determines that the request involves a user computing device exceeding the QoS level attributable to that user computing device, the method continues to step 110 where the DS processing unit lowers the priority of the request in the request priority queue. Lowering the priority of the request will allow the user computing device involved in the request the time needed to return to desired performance levels. By addressing the performance issue with the user computing device, the vault level issue will be resolved.

When the DS processing unit determines that the request does not involve a user computing device exceeding the QoS level attributable to that user computing device, the method continues to step 112 where the DS processing unit determines whether another user computing device affiliated with the logical storage vault exceeds the QoS level attributable to the other user computing device.

When the DS processing unit determines that the other user computing device affiliated with the logical storage vault exceeds the QoS level attributable to the other user computing device, the method continues to step 114 where the DS processing unit increases the priority of the request in the request priority queue. Expediting the processing of the request while another user computing device affiliated with the vault is failing to meet guaranteed levels, will enable the vault to maintain acceptable performance levels overall.

When the DS processing unit determines that the other user computing device affiliated with the logical storage vault does not exceed the QoS level attributable to the other user computing device, the method continues to step 116 where the DS processing unit maintains the priority of the request in the request priority queue. While the user computing devices affiliated with the logical storage vault are able to meet guaranteed levels, there is no need to adjust the priority of the request in the request priority queue.

When the DS processing unit determines at step 106 that the QoS issue is not a vault level issue, the method continues to step 118 where the DS processing unit determines that the QoS issue is a user level issue. The method continues to step 120 where the DS processing unit determines whether the request involves a user computing device exceeding the QoS level attributable to that user computing device. For example, the user computing device may have a specified performance property (e.g., number of requests per time frame, data transfer rate, storage quota, latency guarantee) that needs to be maintained in order for it to function properly. After the DS processing unit has completed the QoS matrix for the storage classes involved in the request, the DS processing unit will determine what the current performance properties are for the user computing device involved in the request. After comparing the QoS matrix values to the guaranteed levels, the DS processing unit can determine whether the guaranteed levels have been exceeded.

When the DS processing unit determines that the request involves the user computing device exceeding the QoS level attributable to that user computing device, the method continues to step 122 where the DS processing unit lowers the priority of the request in the request priority queue. Lowering the priority of the request will allow the user computing device involved in the request the time needed to return to desired performance levels.

When the DS processing unit determines that the request does not involve the user computing device exceeding the QoS level attributable to that user computing device, the method continues to step 124 where the DS processing unit maintains the priority of the request in the request priority queue. While the user computing device is able to meet guaranteed levels, there is no need to adjust the priority of the request in the request priority queue.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit may execute, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory (ROM), random access memory (RAM), volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprising:
   receiving, by a dispersed storage (DS) processing unit of a dispersed storage network (DSN), from a first user computing device of a plurality of user computing devices of the DSN, a request to access a set of encoded data slices, wherein a data segment of a data object is dispersed storage error encoded into the set of encoded data slices, wherein the set of encoded data slices is stored in a set of storage units of the DSN, wherein a first storage container of a plurality of storage containers of the DSN includes the set of storage units, wherein the first storage container supports a first group of logical storage vaults of a plurality of logical storage vaults of the DSN, and wherein the first user computing device is affiliated with a first logical storage vault of the first group of logical storage vaults;

determining, by the DS processing unit, a QoS matrix regarding the request when a quality of service (QoS) issue exists for the DSN, wherein the QoS matrix includes classes for the plurality of user computing devices, the plurality of logical storage vaults, and the plurality of storage containers and, for each class, includes a plurality of performance properties;

determining, by the DS processing unit, QoS levels attributable to the first user computing device, the first logical storage vault, and the first storage container;

determining, by the DS processing unit, a processing priority of the request based on the QoS matrix and the QoS levels; and executing, by the DS processing unit, the request in accordance with the processing priority.

2. The method of claim 1, wherein the plurality of performance properties comprises two or more of:
number of requests per time frame;
data transfer rate;
storage quota; and
latency guarantee.

3. The method of claim 1 further comprising:
determining, by the DS processing unit, that the QoS issue exists when the DSN includes one or more of insufficient storage units and insufficient DS processing units.

4. The method of claim 1 further comprising:
determining, by the DS processing unit, a container level QoS issue as the QoS issue;
determining, by the DS processing unit, whether accessing of the first logical storage vault exceeds a QoS level of the QoS levels attributable to the first logical storage vault; and
when the accessing of the first logical storage vault exceeds the QoS level attributable to the first logical storage vault, lowering, by DS processing unit, the processing priority of the request in a request priority queue.

5. The method of claim 4 further comprising:
when the accessing of the first logical storage vault does not exceed the QoS level attributable to the first logical storage vault, determining, by the DS processing unit, whether accessing of another logical storage vault of the first group of logical storage vaults exceeds a QoS level attributable to the other logical storage vault;
when the accessing of the other logical storage vault exceeds the QoS level attributable to the other logical storage vault, increasing, by DS processing unit, the processing priority of the request in the request priority queue; and
when the accessing of the other logical storage vault does not exceed the QoS level attributable to the other logical storage vault, maintaining, by DS processing unit, the processing priority of the request in the request priority queue.

6. The method of claim 1 further comprising:
determining, by the DS processing unit, a vault level QoS issue as the QoS issue;
determining, by the DS processing unit, whether accessing by the first user computing device exceeds a QoS level of the QoS levels attributable to the first user computing device; and when the accessing by the first user computing device exceeds the QoS level attributable to the first user computing device, lowering, by DS processing unit, the processing priority of the request in a request priority queue.

7. The method of claim 6 further comprising:
when the accessing by the first user computing device does not exceed the QoS level attributable to the first user computing device, determining, by the DS processing unit, whether accessing by another user computing device of the plurality of user computing devices exceeds a QoS level attributable to the other user computing device;
when the accessing by the other user computing device exceeds the QoS level attributable to the other user computing device, increasing, by DS processing unit, the processing priority of the request in the request priority queue; and
when the accessing by the other user computing device does not exceed the QoS level attributable to the other user computing device, maintaining, by DS processing unit, the processing priority of the request in the request priority queue.

8. The method of claim 1 further comprising:
determining, by the DS processing unit, a user computing device level QoS issue as the QoS issue;
determining, by the DS processing unit, whether accessing by the first user computing device exceeds a QoS level of the QoS levels attributable to the first user computing device;
when the accessing by the first user computing device exceeds the QoS level attributable to the first user computing device, lowering, by DS processing unit, the processing priority of the request in a request priority queue; and
when the accessing by the first user computing device does not exceed the QoS level attributable to the first user computing device, maintaining, by DS processing unit, the processing priority of the request in the request priority queue.

9. A dispersed storage (DS) processing unit of a dispersed storage network (DSN) comprising:
an interface;
memory; and
a processing module operably coupled to the memory and the interface, wherein the processing module is configured to:
receive a request from a first user computing device of a plurality of user computing devices of the DSN to access a set of encoded data slices, wherein a data segment of a data object is dispersed storage error encoded into the set of encoded data slices, wherein the set of encoded data slices is stored in a set of storage units of the DSN, wherein a first storage container of a plurality of storage containers of the DSN includes the set of storage units, wherein the first storage container supports a first group of logical storage vaults of a plurality of logical storage vaults of the DSN, and wherein the first user computing device is affiliated with a first logical storage vault of the first group of logical storage vaults;
determine a QoS matrix regarding the request when a quality of service (QoS) issue exists for the DSN, wherein the QoS matrix includes classes for the plurality of user computing devices, the plurality of logical storage vaults, and the plurality of storage containers and, for each class, includes a plurality of performance properties;

determine QoS levels attributable to the first user computing device, the first logical storage vault, and the first storage container;

determine a processing priority of the request based on the QoS matrix and the QoS levels; and execute the request in accordance with the processing priority.

10. The DS processing unit of claim 9, wherein the plurality of performance properties comprises two or more of:

number of requests per time frame;
data transfer rate;
storage quota; and
latency guarantee.

11. The DS processing unit of claim 9, wherein the processing module is further configured to:

determine that the QoS issue exists when the DSN includes one or more of insufficient storage units and insufficient DS processing units.

12. The DS processing unit of claim 9, wherein the processing module is further configured to:

determine a container level QoS issue as the QoS issue;

determine whether accessing of the first logical storage vault exceeds a QoS level of the QoS levels attributable to the first logical storage vault; and when the accessing of the first logical storage vault exceeds the QoS level attributable to the first logical storage vault, lower the processing priority of the request in a request priority queue.

13. The DS processing unit of claim 12, wherein the processing module is further configured to:

when the accessing of the first logical storage vault does not exceed the QoS level attributable to the first logical storage vault, determine whether accessing by another logical storage vault of the first group of logical storage vaults exceeds a QoS level attributable to the other logical storage vault;

when the accessing of the other logical storage vault exceeds the QoS level attributable to the other logical storage vault, increase the processing priority of the request in the request priority queue; and when the accessing of the other logical storage vault does not exceed the QoS level attributable to the other logical storage vault, maintain the processing priority of the request in the request priority queue.

14. The DS processing unit of claim 9, wherein the processing module is further configured to:

determine a vault level QoS issue as the QoS issue;

determine whether accessing by the first user computing device exceeds a QoS level of the QoS levels attributable to the first user computing device; and when the accessing by the first user computing device exceeds the QoS level attributable to the first user computing device, lower the processing priority of the request in a request priority queue.

15. The DS processing unit of claim 14, wherein the processing module is further configured to:

when the accessing by the first user computing device does not exceed the QoS level attributable to the first user computing device, determine whether accessing by another user computing device of the plurality of user computing devices exceeds a QoS level attributable to the other user computing device;

when the accessing by the other user computing device exceeds the QoS level attributable to the other user computing device, increase the processing priority of the request in the request priority queue; and when the accessing by the other user computing device does not exceed the QoS level attributable to the other user computing device, maintain the processing priority of the request in the request priority queue.

16. The DS processing unit of claim 9, wherein the processing module is further configured to:

determine a user computing device level QoS issue as the QoS issue;

determine whether accessing by the first user computing device exceeds a QoS level of the QoS levels attributable to the first user computing device;

when the accessing by the first user computing device exceeds the QoS level attributable to the first user computing device, lower the processing priority of the request in a request priority queue; and when the accessing by the first user computing device does not exceed the QoS level attributable to the first user computing device, maintain the processing priority of the request in the request priority queue.

* * * * *